US012392992B2

(12) United States Patent
Nishimura et al.

(10) Patent No.: US 12,392,992 B2
(45) Date of Patent: Aug. 19, 2025

(54) IMAGING OPTICAL SYSTEM AND CAMERA

(71) Applicant: Panasonic Intellectual Property Management Co., Ltd., Osaka (JP)

(72) Inventors: Naoto Nishimura, Osaka (JP); Yutaro Sonoyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 529 days.

(21) Appl. No.: 17/748,312

(22) Filed: May 19, 2022

(65) Prior Publication Data

US 2022/0382015 A1  Dec. 1, 2022

(30) Foreign Application Priority Data

May 26, 2021  (JP) ................................ 2021-088044

(51) Int. Cl.
*G02B 9/60* (2006.01)
*G02B 9/34* (2006.01)
(Continued)

(52) U.S. Cl.
CPC .............. *G02B 9/60* (2013.01); *G02B 9/34* (2013.01); *G02B 9/62* (2013.01); *G02B 13/18* (2013.01);
(Continued)

(58) Field of Classification Search
CPC ......... G02B 9/60; G02B 13/0045; G02B 3/04
See application file for complete search history.

(56) References Cited

U.S. PATENT DOCUMENTS 5,999,337 A    12/1999  Ozaki
2013/0010375 A1  1/2013  Chen et al.
(Continued)

FOREIGN PATENT DOCUMENTS

CN    108681050    10/2018
CN    109445068    3/2019
(Continued)

OTHER PUBLICATIONS

Notice of Reasons for Refusal issued Dec. 24, 2024 in corresponding Japanese Patent Application No. 2021-088044, with English-language Translation.
(Continued)

*Primary Examiner* — Jonathan Y Jung
(74) *Attorney, Agent, or Firm* — Wenderoth, Lind & Ponack, L.L.P.

(57) ABSTRACT

An imaging optical system includes: a first lens having negative power and having a concave image-side surface; a second lens having power; a third lens having positive power; a fourth lens having power; and a fifth lens having power. The imaging optical system satisfies conditions expressed by the following Inequalities (1) and (2):

$R11/TTL < 0.25$  (1)

$ThL1/Thsum < 0.15$  (2)

where R11 is a paraxial radius of curvature of an object-side surface of the first lens, TTL is a total optical length of the imaging optical system, ThL1 is a thickness of the first lens on an optical axis of the imaging optical system, and Thsum is a sum of respective thicknesses of all lenses, including the first to fifth lenses, on the optical axis of the imaging optical system.

6 Claims, 11 Drawing Sheets

(51) Int. Cl.
  *G02B 9/62* (2006.01)
  *G02B 13/18* (2006.01)
  *B60R 1/26* (2022.01)
(52) U.S. Cl.
  CPC ............. *B60R 1/26* (2022.01); *B60R 2300/10* (2013.01); *B60R 2300/20* (2013.01)
(56) References Cited

U.S. PATENT DOCUMENTS

| | | | | |
|---|---|---|---|---|
| 2015/0331224 A1* | 11/2015 | Shih | ............. | G02B 13/0015 |
| | | | | 359/756 |
| 2018/0210177 A1* | 7/2018 | Liu | ............. | G02B 13/0045 |
| 2019/0121095 A1 | 4/2019 | Tada et al. | | |
| 2020/0150399 A1 | 5/2020 | Chen et al. | | |
| 2020/0257078 A1* | 8/2020 | Chen | ............. | H04N 23/55 |
| 2021/0096328 A1* | 4/2021 | Wang | ............. | G02B 13/004 |
| 2021/0389571 A1* | 12/2021 | Yamazaki | ............. | G02B 13/0045 |

FOREIGN PATENT DOCUMENTS

| | | |
|---|---|---|
| CN | 109557644 | 4/2019 |
| JP | H11-125767 | 5/1999 |
| JP | 2007-121513 | 5/2007 |
| JP | 2011-75633 | 4/2011 |
| JP | 2019-78839 | 5/2019 |
| JP | 2020-46565 | 3/2020 |
| WO | 2019/093377 | 5/2019 |

OTHER PUBLICATIONS

Office Action issued Apr. 1, 2025 in corresponding Japanese Patent Application No. 2021-088044, with English translation, 11 pages.

* cited by examiner

500

IMAGING OPTICAL SYSTEM AND CAMERA

CROSS-REFERENCE TO RELATED APPLICATIONS

The present application is based upon, and claims the benefit of priority to, Japanese Patent Application No. 2021-088044, filed on May 26, 2021, the entire disclosures of which are hereby incorporated by reference.

TECHNICAL FIELD

The present disclosure generally relates to an imaging optical system and a camera. More particularly, the present disclosure relates to an imaging optical system including a plurality of lenses and a camera.

BACKGROUND ART

WO2019/093377 A1 discloses an imaging optical system including a positive or negative first lens group, an aperture stop, and a positive second lens group, which are arranged in this order such that the positive or negative first lens group is located closer to the object than the aperture step or the positive second lens group. In the imaging optical system, a negative lens, which is located closer to the object than any other lens in the first lens group, has an aspheric surface as its object-side surface. The aspheric surface has a convex object-side surface. The aspheric surface has the largest paraxial curvature within its effective diameter and includes a portion, of which the curvature is a half of less of the paraxial curvature, within its effective diameter.

SUMMARY

The present disclosure provides an imaging optical system and a camera having the ability to compensate for various types of aberrations sufficiently.

An imaging optical system according to an aspect of the present disclosure includes: a first lens having negative power and having a concave surface arranged to face an image; a second lens having power; a third lens having positive power; a fourth lens having power; and a fifth lens having power. The first lens, the second lens, the third lens, the fourth lens, and the fifth lens are arranged in this order such as the first lens is located closer to an object than any other one of the second, third, fourth, and fifth lenses and that the fifth lens is located closer to the image than any other one of the first, second, third, and fourth lenses. The imaging optical system satisfies conditions expressed by the following Inequalities (1) and (2):

$$R11/TTL<0.25 \tag{1}$$

$$ThL1/Thsum<0.15 \tag{2}$$

where $R11$ is a paraxial radius of curvature of an object-side surface of the first lens, TTL is a total optical length of the imaging optical system, $ThL1$ is a thickness of the first lens on an optical axis of the imaging optical system, and Thsum is a sum of respective thicknesses of all lenses, including the first, second, third, fourth, and fifth lenses, on the optical axis of the imaging optical system.

A camera according to another aspect of the present disclosure includes: an imaging optical system to form an optical image of an object; and an image sensor to transform the optical image, formed by the imaging optical system, into an electrical image signal. The imaging optical system includes: a first lens having negative power and having a concave surface arranged to face an image; a second lens having power; a third lens having positive power; a fourth lens having power; and a fifth lens having power. The first lens, the second lens, the third lens, the fourth lens, and the fifth lens are arranged in this order such as the first lens is located closer to an object than any other one of the second, third, fourth, and fifth lenses and that the fifth lens is located closer to the image than any other one of the first, second, third, and fourth lenses. The imaging optical system satisfies conditions expressed by the following Inequalities (1) and (2):

$$R11/TTL<0.25 \tag{1}$$

$$ThL1/Thsum<0.15 \tag{2}$$

where $R11$ is a paraxial radius of curvature of an object-side surface of the first lens, TTL is a total optical length of the imaging optical system, $ThL1$ is a thickness of the first lens on an optical axis of the imaging optical system, and Thsum is a sum of respective thicknesses of all lenses, including the first, second, third, fourth, and fifth lenses, on the optical axis of the imaging optical system.

BRIEF DESCRIPTION OF DRAWINGS

The figures depict one or more implementations in accordance with the present teaching, by way of example only, not by way of limitations. In the figures, like reference numerals refer to the same or similar elements.

DESCRIPTION OF EMBODIMENTS

Embodiments of the present disclosure will now be described in detail with reference to the accompanying drawings as appropriate. Note that unnecessarily detailed description may be omitted. For example, detailed description of already well-known matters and redundant description of substantially the same configuration may be omitted. This is done to avoid making the following description overly redundant and thereby to help one of ordinary skill in the art understand the present disclosure easily.

In addition, note that the accompanying drawings and the following description are provided to help one of ordinary skill in the art understand the present disclosure fully and should not be construed as limiting the scope of the present disclosure, which is defined by the appended claims.

First to Fourth Embodiments: Imaging Optical Systems

An imaging optical system according to each of the first to fourth embodiments to be described below may produce a bright image with various types of aberrations compensated for sufficiently. FIGS. 1, 3, 5, and 7 illustrate lens arrangement diagrams according to first, second, third, and fourth embodiments, respectively. In FIGS. 1, 3, 5, and 7, the asterisk (*) attached to a surface of a particular lens indicates that the surface is an aspheric surface. Note that in the lenses, an object-side surface or an image-side surface having no asterisks is a spherical surface. Furthermore, in FIGS. 1, 3, 5, and 7, the straight line drawn at the right end indicates the position of the image plane S. Note that FIGS. 1, 3, 5, and 7 have the same aspect ratio.

First Embodiment

Figure 1:
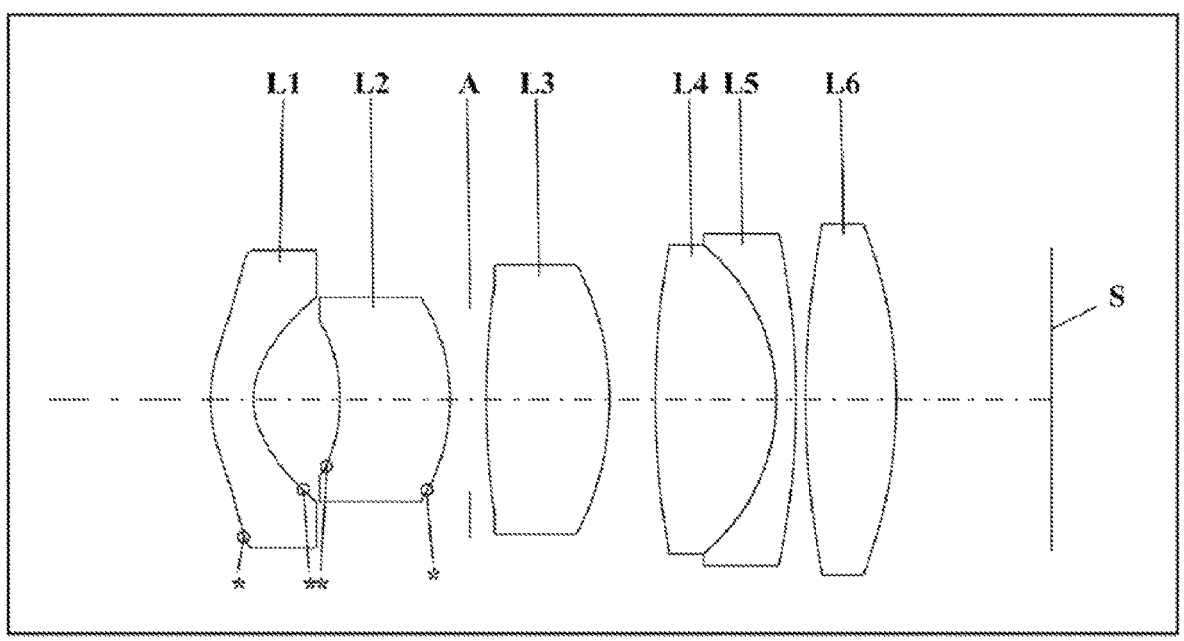
FIG. 1 illustrates lens arrangements showing what state an imaging optical system according to a first embodiment (corresponding to a first example of numerical values) assumes at an infinity focus point.
Figure 2:
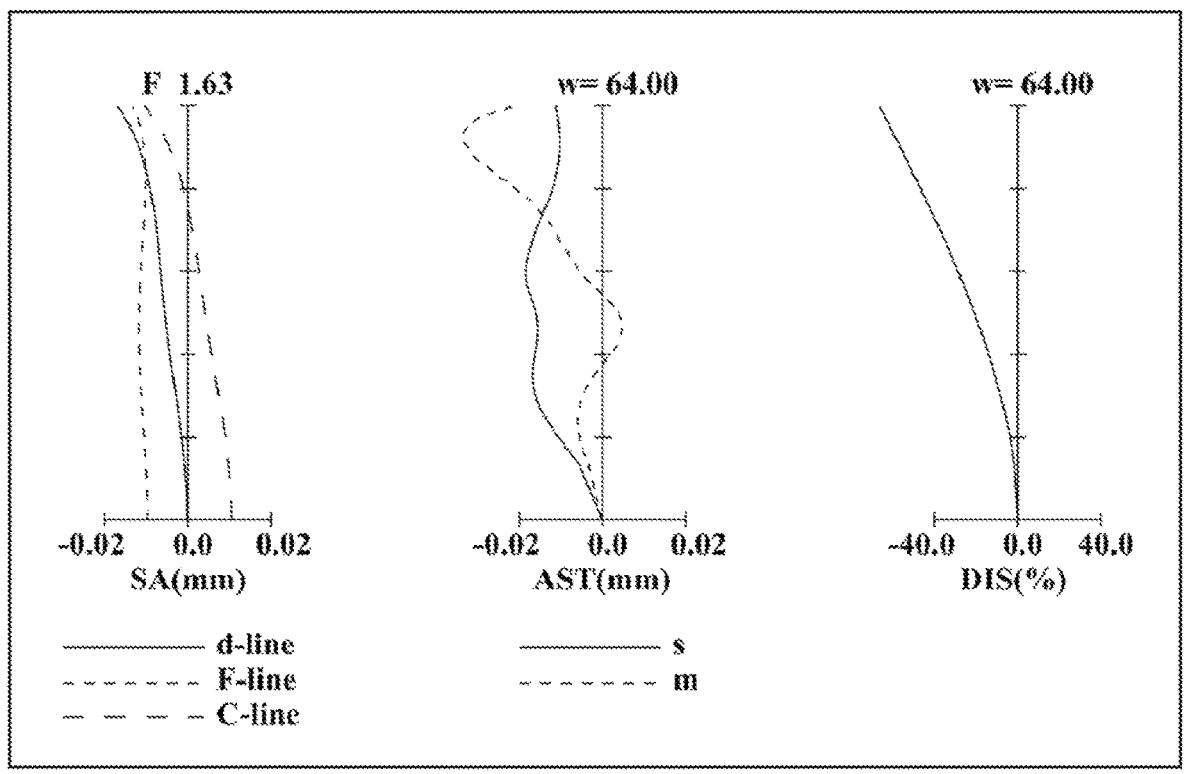
FIG. 2 illustrates longitudinal aberration diagrams showing what state the imaging optical system assumes at the infinity focus point in the first example of numerical values.

FIG. 1 illustrates an imaging optical system according to a first embodiment.

The imaging optical system according to the first embodiment includes: a first lens L1 having negative power; a second lens L2 having positive power; an aperture stop A; a third lens L3 having positive power; a fourth lens L4 having positive power; a fifth lens L5 having negative power; and a sixth lens L6 having positive power. The first lens L1, the second lens L2, the aperture stop A, the third lens L3, the fourth lens L4, the fifth lens L5, and the sixth lens L6 are arranged in this order such as the first lens L1 is located closer to an object than any other constituent element of this imaging optical system and that the sixth lens L6 is located closer to an image plane S than any other constituent element of this imaging optical system.

The respective lenses will be described one by one.

The first lens L1 is a meniscus lens having a convex object-side surface. The first lens L1 has aspheric shapes on both surfaces thereof along the optical axis. As used herein, "both surfaces along the optical axis" refer to an object-side surface and an image-side surface. Also, as used herein, the "optical axis" refers to the optical axis of the imaging optical system unless otherwise stated.

The second lens L2 is a meniscus lens having a convex image-side surface. The second lens L2 has aspheric shapes on both surfaces thereof along the optical axis.

The third lens L3 is a biconvex lens.

The fourth lens L4 is a biconvex lens.

The fifth lens L5 is a meniscus lens having a convex image-side surface.

The sixth lens L6 is a biconvex lens.

The fourth lens L4 and the fifth lens L5 are bonded together via an adhesive, for example, to form a bonded lens. In other words, the bonded lens includes the fourth lens L4 and the fifth lens L5.

Second Embodiment

Figure 3:
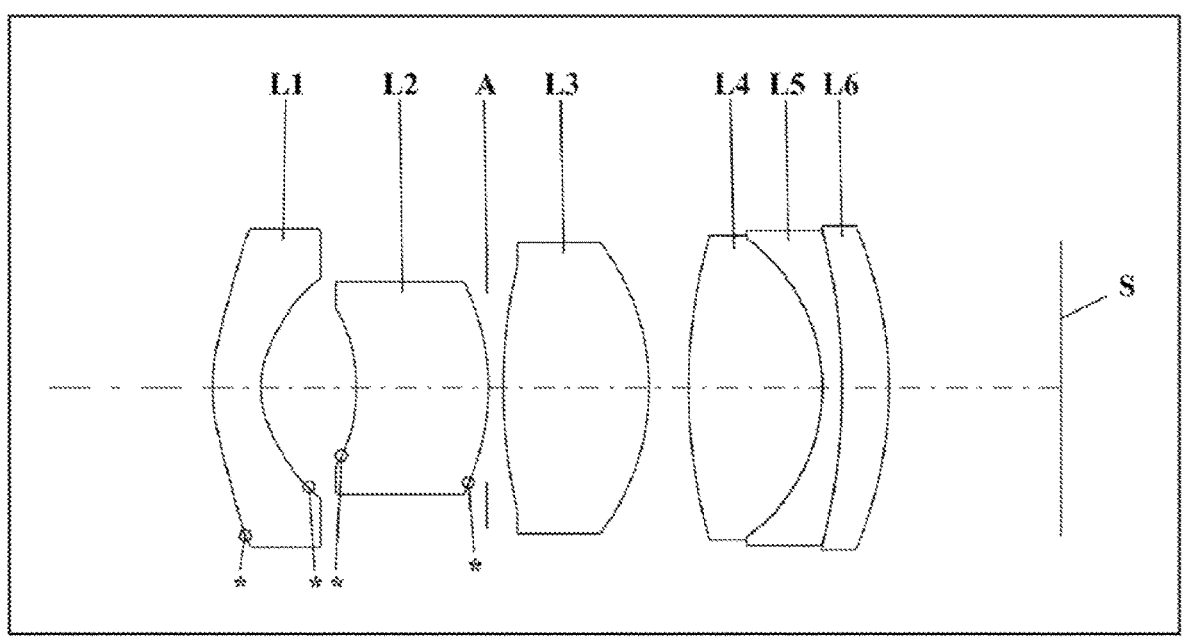
FIG. 3 illustrates lens arrangements showing what state an imaging optical system according to a second embodiment (corresponding to a second example of numerical values) assumes at an infinity focus point.
Figure 4:
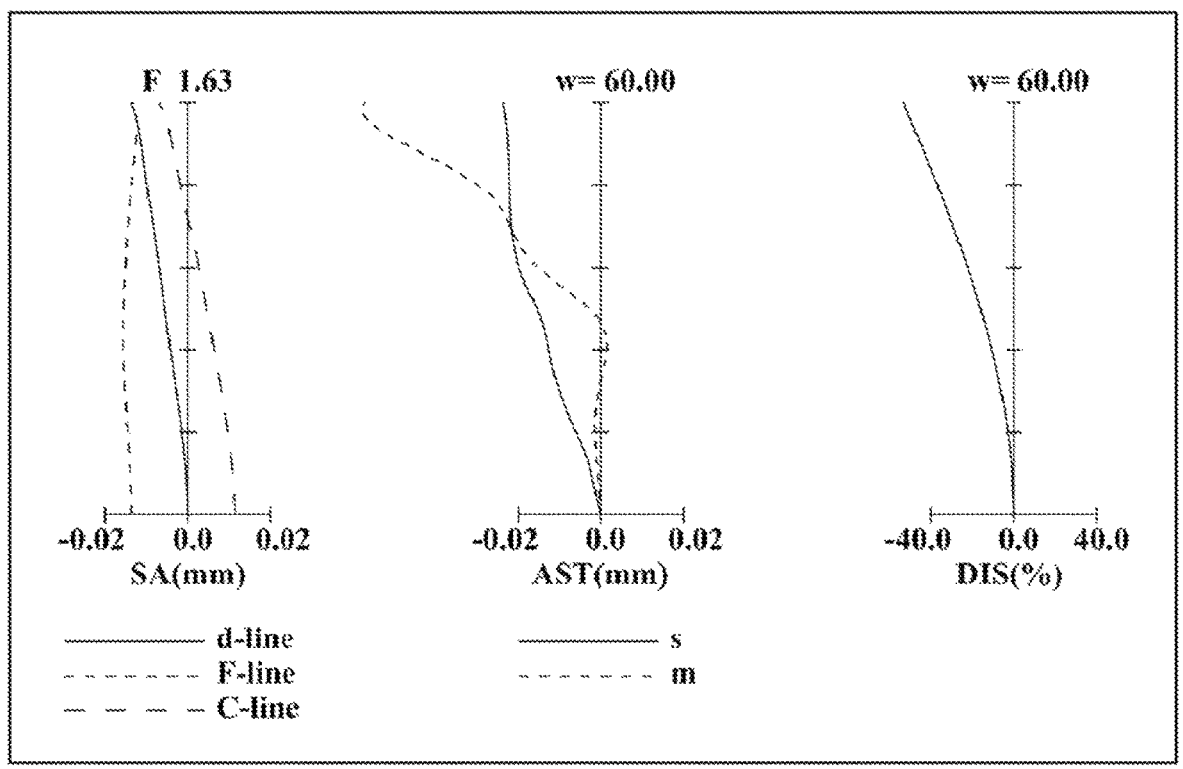
FIG. 4 illustrates longitudinal aberration diagrams showing what state the imaging optical system assumes at the infinity focus point in the second example of numerical values.

FIG. 3 illustrates an imaging optical system according to a second embodiment.

The imaging optical system according to the second embodiment includes: a first lens L1 having negative power; a second lens L2 having positive power; an aperture stop A; a third lens L3 having positive power; a fourth lens L4 having positive power; a fifth lens L5 having negative power; and a sixth lens L6 having positive power. The first lens L1, the second lens L2, the aperture stop A, the third lens L3, the fourth lens L4, the fifth lens L5, and the sixth lens L6 are arranged in this order such as the first lens L1 is located closer to an object than any other constituent element of this imaging optical system and that the sixth lens L6 is located closer to an image plane S than any other constituent element of this imaging optical system.

The respective lenses will be described one by one.

The first lens L1 is a meniscus lens having a convex object-side surface. The first lens L1 has aspheric shapes on both surfaces thereof along the optical axis.

The second lens L2 is a meniscus lens having a convex image-side surface. The second lens L2 has aspheric shapes on both surfaces thereof along the optical axis.

The third lens L3 is a biconvex lens.

The fourth lens L4 is a biconvex lens.

The fifth lens L5 is a meniscus lens having a convex image-side surface.

The sixth lens L6 is a meniscus lens having a convex image-side surface.

The fourth lens L4, the fifth lens L5, and the sixth lens L6 are bonded together via an adhesive, for example, to form a bonded lens. In other words, the bonded lens includes the fourth lens L4, the fifth lens L5, and the sixth lens L6.

Third Embodiment

Figure 5:
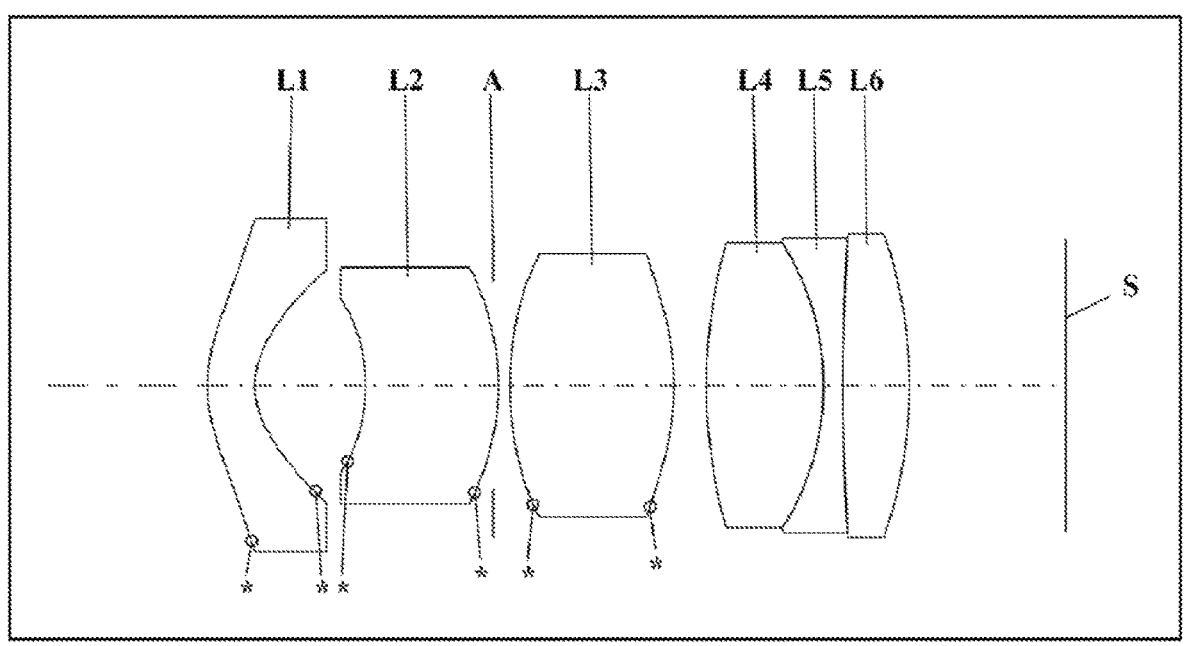
FIG. 5 illustrates lens arrangements showing what state an imaging optical system according to a third embodiment (corresponding to a third example of numerical values) assumes at an infinity focus point.
Figure 6:
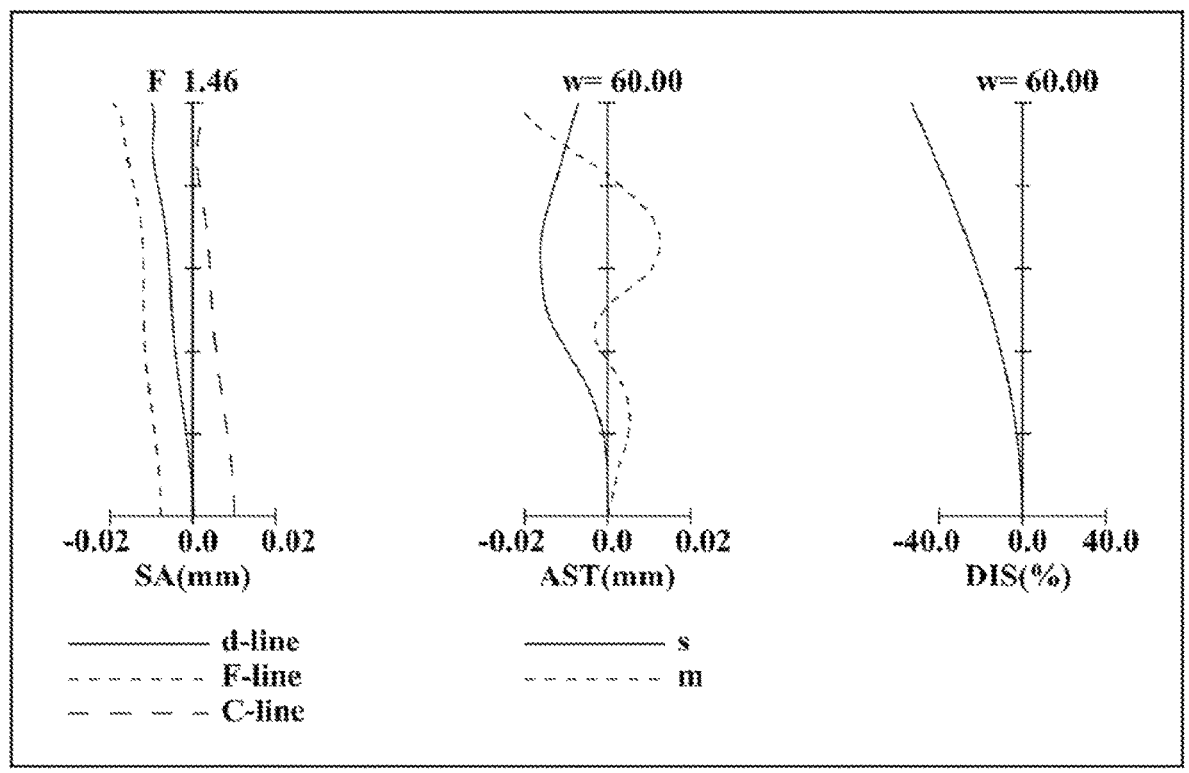
FIG. 6 illustrates longitudinal aberration diagrams showing what state the imaging optical system assumes at the infinity focus point in the third example of numerical values.

FIG. 5 illustrates an imaging optical system according to a third embodiment.

The imaging optical system according to the third embodiment includes: a first lens L1 having negative power; a second lens L2 having negative power; an aperture stop A; a third lens L3 having positive power; a fourth lens L4 having positive power; a fifth lens L5 having negative power; and a sixth lens L6 having positive power. The first lens L1, the second lens L2, the aperture stop A, the third lens L3, the fourth lens L4, the fifth lens L5, and the sixth lens L6 are arranged in this order such as the first lens L1 is located closer to an object than any other constituent element of this imaging optical system and that the sixth lens L6 is located closer to an image plane S than any other constituent element of this imaging optical system.

The respective lenses will be described one by one.

The first lens L1 is a meniscus lens having a convex object-side surface. The first lens L1 has aspheric shapes on both surfaces thereof along the optical axis.

The second lens L2 is a meniscus lens having a convex image-side surface. The second lens L2 has aspheric shapes on both surfaces thereof along the optical axis.

The third lens L3 is a biconvex lens. The third lens L3 has aspheric shapes on both surfaces thereof along the optical axis.

The fourth lens L4 is a biconvex lens.

The fifth lens L5 is a biconcave lens.

The sixth lens L6 is a biconvex lens.

The fourth lens L4, the fifth lens L5, and the sixth lens L6 are bonded together via an adhesive, for example, to form a bonded lens. In other words, the bonded lens includes the fourth lens L4, the fifth lens L5, and the sixth lens L6.

Fourth Embodiment

Figure 7:
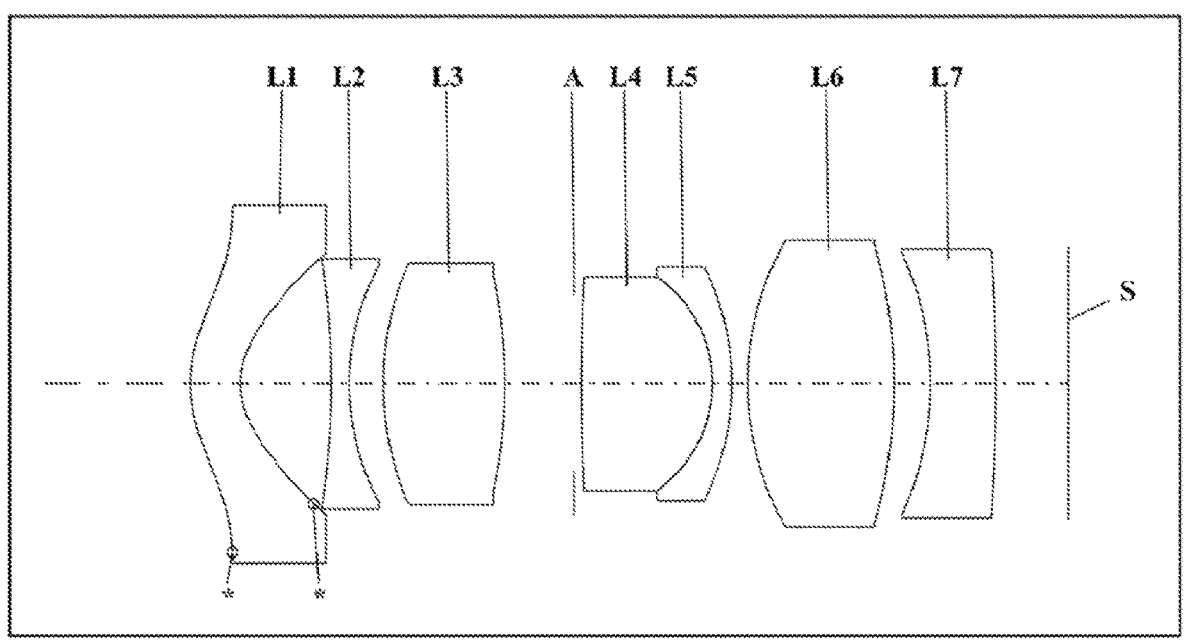
FIG. 7 illustrates lens arrangements showing what state an imaging optical system according to a fourth embodiment (corresponding to a fourth example of numerical values) assumes at an infinity focus point.
Figure 8:
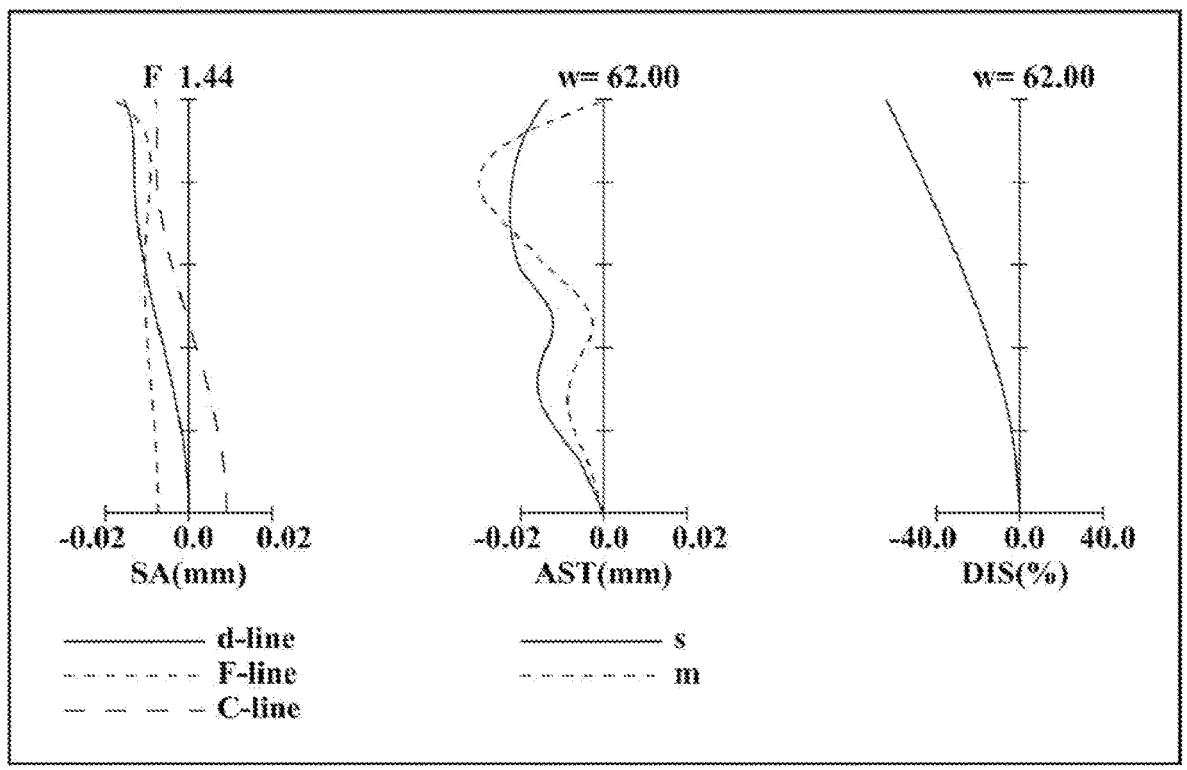
FIG. 8 illustrates longitudinal aberration diagrams showing what state the imaging optical system assumes at the infinity focus point in the fourth example of numerical values.

FIG. 7 illustrates an imaging optical system according to a fourth embodiment.

The imaging optical system according to the fourth embodiment includes: a first lens L1 having negative power; a second lens L2 having negative power; a third lens L3 having positive power; an aperture stop A; a fourth lens L4 having positive power; a fifth lens L5 having negative power; a sixth lens L6 having positive power; and a seventh lens L7 having negative power. The first lens L1, the second lens L2, the third lens L3, the aperture stop A, the fourth lens L4, the fifth lens L5, the sixth lens L6, and the seventh lens L7 are arranged in this order such as the first lens L1 is located closer to an object than any other constituent element of this imaging optical system and that the seventh lens L7 is located closer to an image plane S than any other constituent element of this imaging optical system.

The respective lenses will be described one by one.

The first lens L1 is a meniscus lens having a convex object-side surface. The first lens L1 has aspheric shapes on both surfaces thereof along the optical axis.

The second lens L2 is a biconcave lens.

The third lens L3 is a biconvex lens.

The fourth lens L4 is a biconvex lens.

The fifth lens L5 is a meniscus lens having a convex image-side surface.

The sixth lens L6 is a biconvex lens.

The seventh lens L7 is a meniscus lens having a convex image-side surface.

The fourth lens L4 and the fifth lens L5 are bonded together via an adhesive, for example, to form a bonded lens. In other words, the bonded lens includes the fourth lens L4 and the fifth lens L5.

Conditions and Advantages

Next, beneficial conditions that an imaging optical system such as the ones according to the first to fourth embodiments described above should satisfy will be described. That is to say, a plurality of beneficial conditions may be defined for the imaging optical system according to each of these four embodiments. In that case, an imaging optical system, of which the configuration satisfies all of these conditions, is most advantageous. Alternatively, an imaging optical system that achieves its expected advantages by satisfying any of the individual conditions to be described below may also be obtained.

An imaging optical system according to the present disclosure, such as the imaging optical systems according to the first to fourth embodiments described above, includes: a first lens L1 having negative power and having a concave surface arranged to face an image; a second lens L2 having power; a third lens L3 having positive power; a fourth lens L4 having power; and a fifth lens L5 having power. The first lens L1, the second lens L2, the third lens L3, the fourth lens L4, and the fifth lens L5 are arranged in this order such as the first lens L1 is located closer to an object than any other one of the second, third, fourth, and fifth lenses L2-L5 and that the fifth lens L5 is located closer to the image than any other one of the first, second, third, and fourth lenses L1-L4.

The imaging optical system preferably satisfies conditions expressed by the following Inequalities (1) and (2):

$$R11/TTL < 0.25 \quad (1)$$

$$ThL1/Thsum < 0.15 \quad (2)$$

where R11 is a paraxial radius of curvature of an object-side surface of the first lens L1, TTL is a total optical length of the imaging optical system, ThL1 is the thickness of the first lens L1 on the optical axis of the imaging optical system, and Thsum is the sum of respective thicknesses of all lenses, including the first, second, third, fourth, and fifth lenses L1-L5, on the optical axis of the imaging optical system. Note that the units of these parameters should be the same (e.g., the units of R11, TTL, ThL1, and Thsum are all millimeters).

The condition expressed by the Inequality (1) defines a preferred range of the ratio of the paraxial radius of curvature of the object-side surface of the first lens L1 to the total optical length (i.e., the length, measured along the optical axis, from the object-side surface of the first lens L1 to the image plane S).

If this ratio were equal to or greater than the upper limit of this Inequality (1), it would be impossible to effectively prevent ghost light, reflected from the object-side surface of the first lens L1, from being incident on the image plane S. In addition, the angle resolution around the optical axis would decrease too much to display an object around the optical axis with higher zoom power than its surroundings.

The condition expressed by the Inequality (2) defines the ratio of the thickness ThL1 on the optical axis of the first lens L1 to the sum Thsum of respective thicknesses on the optical axis of all lenses having substantive power.

If the ratio were equal to or greater than the upper limit of the range defined by this Inequality (2), then the first lens L1 would be so thick that it would be difficult to maintain a sufficient angle resolution around the optical axis and downsize the imaging optical system at a time.

In this case, within the ranges set by these Inequalities (1) and (2), the condition(s) expressed by one or both of the following Inequalities (1a) and (2a) is/are preferably satisfied:

$$R11/TTL < 0.24 \quad (1a)$$

$$ThL1/Thsum < 0.12 \quad (2a)$$

This would enhance the advantages described above.

Also, within the ranges set by these Inequalities (1) and (2), the condition(s) expressed by one or both of the following Inequalities (1b) and (2b) is/are more preferably satisfied:

$$R11/TTL < 0.23 \quad (1b)$$

$$ThL1/Thsum < 0.10 \quad (2b)$$

This would further enhance the advantages described above.

Also, in this imaging optical system, the fourth lens L4 and the fifth lens L5 may be bonded together. The fourth lens L4 may have positive power. The fifth lens L5 may have negative power. The imaging optical system preferably satisfies the condition expressed by the following Inequality (3):

$$30<|vd\_L4-vd\_L5|<65 \qquad (3)$$

where vd_L4 is an Abbe number with respect to a d-line of the fourth lens L4 and vd_L5 is an Abbe number with respect to a d-line of the fifth lens L5.

The condition expressed by this Inequality (3) defines a preferred range of the difference between the Abbe number with respect to a d-line of the fourth lens L4 and the Abbe number with respect to a d-line of the fifth lens L5.

If the difference were equal to or less than the lower limit of the range defined by this Inequality (3), then it would be difficult to compensate for chromatic aberration. On the other hand, if the difference were equal to or greater than the upper limit of the range defined by this Inequality (3), then the glass material for the lens with the lower dispersion, out of the fourth lens L4 and the fifth lens L5, would have a lower refractive index and higher sensitivity to optical performance, thus making it difficult to manufacture the imaging optical system with good stability.

In this case, within the range set by this Inequality (3), the condition(s) expressed by one or both of the following Inequalities (3a) and (3b) is/are preferably satisfied:

$$35<|vd\_L4-vd\_L5| \qquad (3a)$$

$$|vd\_L4-vd\_L5|<63 \qquad (3b)$$

This would enhance the advantages described above.

Also, within the range set by this Inequality (3), the condition(s) expressed by one or both of the following Inequalities (3c) and (3d) is/are more preferably satisfied:

$$40<|vd\_L4-vd\_L5| \qquad (3c)$$

$$|vd\_L4-vd\_L5|<60 \qquad (3d)$$

This would further enhance the advantages described above.

Furthermore, the imaging optical system preferably satisfies a condition expressed by, for example, the following Inequality (4):

$$-7.0E-6<\text{Min}(dn/dt)<0.0E-6 \qquad (4)$$

where Min (dn/dt) is the smaller one of respective refractive index temperature coefficients with respect to a d-line of the third lens L3 and the fourth lens L4 at a temperature falling within the range from 20° C. to 40° C., and E−6 is a minus sixth power of 10.

The condition expressed by this Inequality (4) defines the range of the minimum values of the refractive index temperature coefficients with respect to a d-line of the third lens L3 and the fourth lens L4 at a temperature falling within the range from 20° C. to 40° C.

If the minimum value were less than the lower limit of the range defined by this Inequality (4), then the variation in focus position and angle of view due to a change in ambient temperature would be compensated for too excessively to maintain good imaging performance easily.

On the other hand, if the minimum value were equal to or greater than the upper limit of the range defined by this Inequality (4), then the variation in focus position and angle of view due to a change in ambient temperature would be compensated for too insufficiently to maintain good imaging performance easily.

In this case, within the range set by this Inequality (4), the condition(s) expressed by one or both of the following Inequalities (4a) and (4b) is/are preferably satisfied:

$$-6.5E-6<\text{Min}(dn/dt) \qquad (4a)$$

$$\text{Min}(dn/dt)<-1.5E-6 \qquad (4b)$$

This would enhance the advantages described above.

Also, within the range set by this Inequality (4), the condition(s) expressed by one or both of the following Inequalities (4c) and (4d) is/are more preferably satisfied:

$$-6.0E-6<\text{Min}(dn/dt) \qquad (4c)$$

$$\text{Min}(dn/dt)<-2.6E-6 \qquad (4d)$$

This would further enhance the advantages described above.

Furthermore, the imaging optical system preferably satisfies a condition expressed by, for example, the following Inequality (5):

$$45°<\omega \qquad (5)$$

where $\omega$ is a half angle of view of the imaging optical system.

The condition expressed by this Inequality (5) defines a half angle of view of the imaging optical system.

If the half angle of view were equal to or less than the lower limit of the range defined by this Inequality (5), then the angle resolution around the optical axis would be too high to detect the surrounding objects smoothly.

In this case, within the range set by this Inequality (5), the condition expressed by the following Inequality (5a) is preferably satisfied:

$$50°<\omega \qquad (5a)$$

This would enhance the advantages described above.

In this case, within the range set by this Inequality (5), the condition expressed by the following Inequality (5b) is more preferably satisfied:

$$55°<\omega \qquad (5b)$$

This would further enhance the advantages described above.

Furthermore, the imaging optical system preferably satisfies a condition expressed by, for example, the following Inequality (6):

$$0.4<Th\text{sum}/TTL<1.6 \qquad (6).$$

The condition expressed by this Inequality (6) defines the ratio of the sum of the respective thicknesses on the optical axis of all lenses having substantive power that form the imaging optical system to the total optical length of the imaging optical system (i.e., the length measured along the optical axis from the object-side surface of the first lens L1 to the image plane S).

If the ratio were equal to or less than the lower limit of the range defined by this Inequality (6), then the ratio of the sum of the respective thicknesses of the lenses to the total optical length would be too small to downsize the optical system easily.

On the other hand, if the ratio were equal to or greater than the upper limit of the range defined by this Inequality (6), then the volume of the lenses would increase too much to realize downsizing smoothly.

In this case, within the range set by this Inequality (6), the condition(s) expressed by one or both of the following Inequalities (6a) and (6b) is/are preferably satisfied:

$$0.5 < Th\text{sum}/TTL \quad (6a)$$

$$Th\text{sum}/TTL < 0.75 \quad (6b)$$

This would further enhance the advantages described above.

Also, within the range set by this Inequality (6), the condition(s) expressed by one or both of the following Inequalities (6c) and (6d) is/are more preferably satisfied:

$$0.6 \leq Th\text{sum}/TTL \quad (6c)$$

$$Th\text{sum}/TTL < 0.70 \quad (6d)$$

This would further enhance the advantages described above.

Furthermore, the imaging optical system preferably satisfies a condition expressed by, for example, the following Inequality (7):

$$-5.0 < (R12+R11)/(R12-R11) < -1.5 \quad (7)$$

where R11 is a paraxial radius of curvature of an object-side surface of the first lens L1 and R12 is a paraxial radius of curvature of an image-side surface of the first lens L1. Note that the units of these parameters should be the same (e.g., the units of R11 and R12 are millimeters).

The condition expressed by this Inequality (7) defines the shape factor of the first lens L1 of the imaging optical system.

If the ratio were equal to or less than the lower limit of the range defined by this Inequality (7), then the radius of curvature of the object-side surface of the first lens L1 would increase relative to the radius of curvature of the impact-side surface thereof, thus making it difficult to compensate for the spherical aberration sufficiently.

On the other hand, if the ratio were equal to or greater than the upper limit of the range defined by this Inequality (7), then the radius of curvature of the object-side surface of the first lens L1 would decrease too much relative to the radius of curvature of the impact-side surface thereof, thus making it more difficult to manufacture the first lens L1 and possibly causing a decrease in yield and/or an increase in manufacturing cost.

In this case, within the range set by this Inequality (7), the condition(s) expressed by one or both of the following Inequalities (7a) and (7b) is/are preferably satisfied:

$$-4.5 < (R12+R11)/(R12-R11) \quad (7a)$$

$$(R12+R11)/(R12-R11) < -2.0 \quad (7b)$$

This would enhance the advantages described above.

Also, within the range set by this Inequality (7), the condition(s) expressed by one or both of the following Inequalities (7c) and (7d) is/are more preferably satisfied:

$$-4.0 < (R12+R11)/(R12-R11) \quad (7c)$$

$$(R12+R11)/(R12-R11) < -2.5 \quad (7d)$$

This would further enhance the advantages described above.

Fifth Embodiment: Camera

Next, an onboard camera will be described as an exemplary camera including the imaging optical system according to the first embodiment. In the onboard camera, the imaging optical system according to the first embodiment may be replaced with any one of the imaging optical systems according to the second, third, and fourth embodiments described above.

Figure 9:
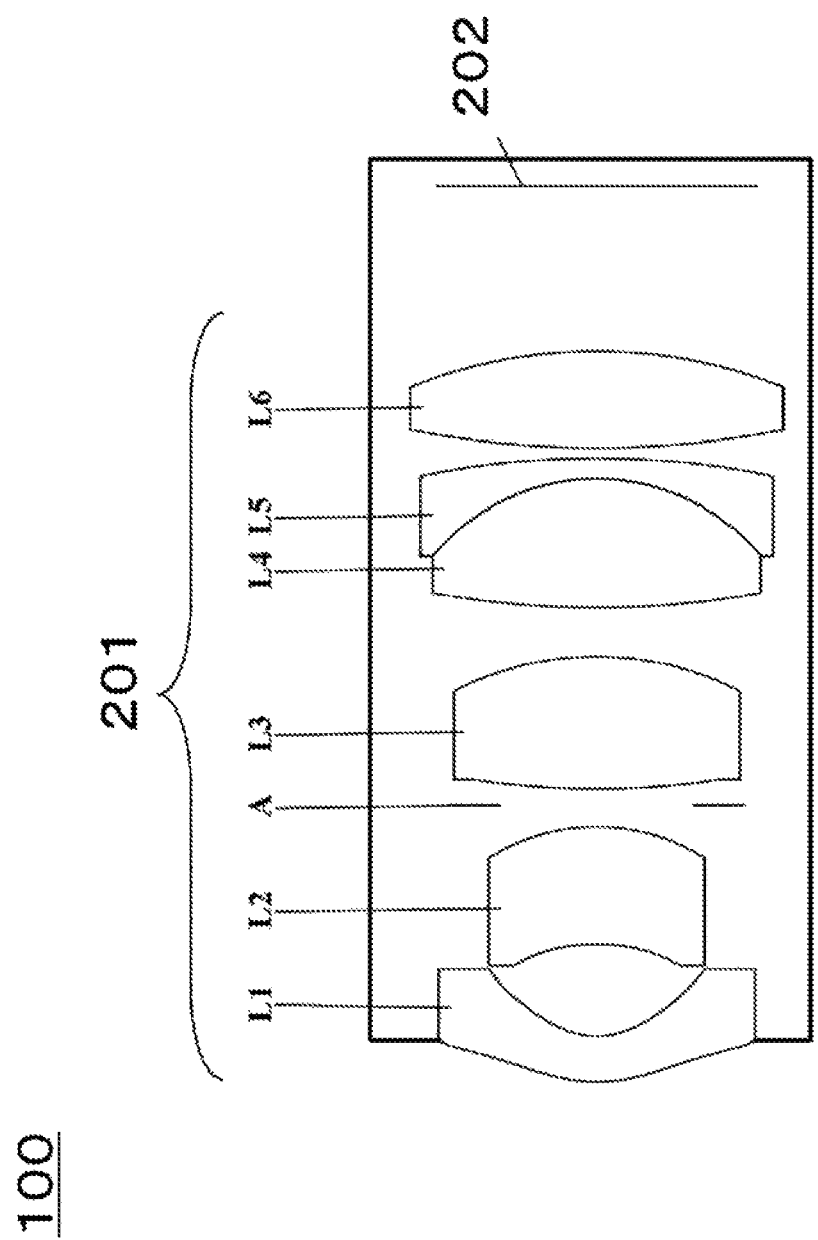
FIG. 9 is a schematic representation of an onboard camera including the imaging optical system according to the first embodiment.

FIG. 9 is a schematic representation of an onboard camera including the imaging optical system according to the first embodiment.

The onboard camera 100 includes: an imaging optical system 201 for forming an optical image of an object; and an image sensor 202 for transforming the optical image formed by the imaging optical system 201 into an electrical image signal. The image sensor 202 is disposed at the image plane S of the imaging optical system according to the first embodiment.

Figure 10:
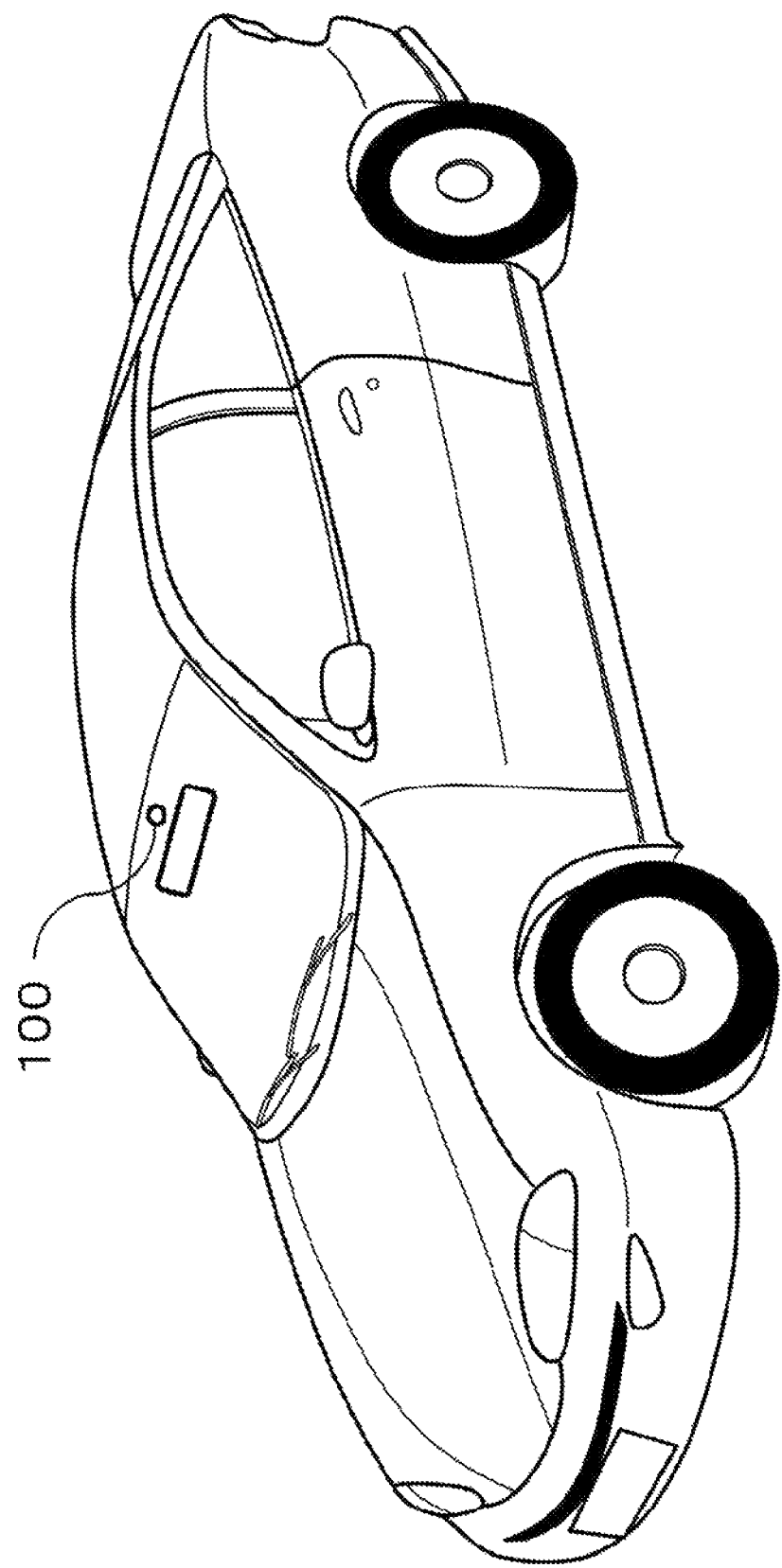
FIG. 10 is a schematic representation of an automobile including an onboard camera at a front position inside a vehicle cabin thereof.

FIG. 10 is a schematic representation of a vehicle 500 (e.g., an automobile in this example) including the onboard camera 100 at a front position inside the vehicle cabin thereof.

Figure 11:
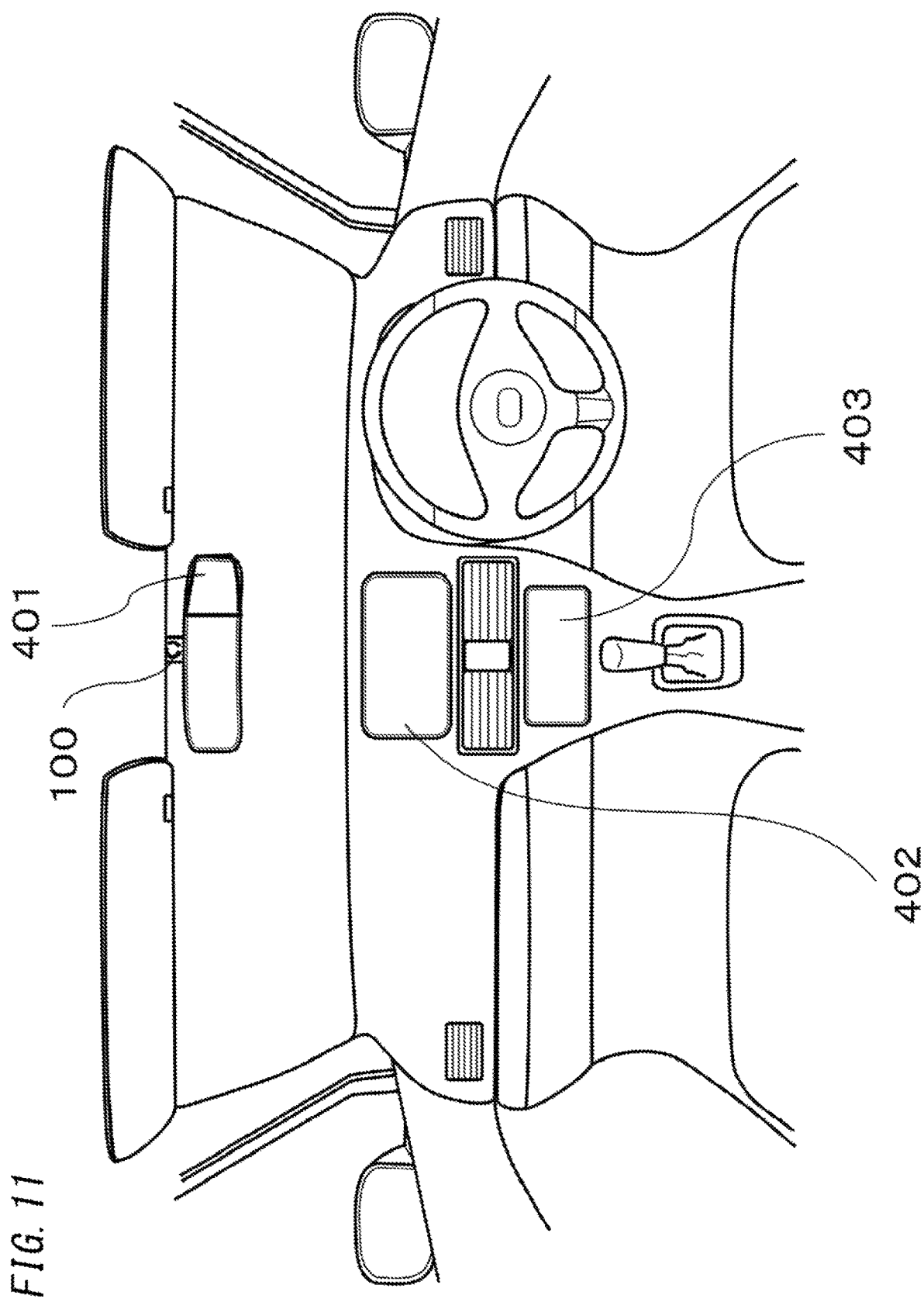
FIG. 11 is a schematic representation illustrating a vehicle cabin of an automobile including an onboard camera at a front position as viewed forward from inside the vehicle cabin.

FIG. 11 is a schematic representation illustrating a vehicle cabin of the vehicle 500 (e.g., an automobile in this example) including the onboard camera 100 at a front position as viewed forward from inside the vehicle cabin.

The onboard camera 100 is installed in the vehicle 500 and used as either a sensing camera or a view camera. An image captured by the sensing camera is used to check an intervehicle distance between the vehicle 500 itself and another vehicle. An image captured by the view camera is displayed on a monitor inside the vehicle cabin and used by the driver to monitor the circumstances in front of, behind, and beside, the vehicle 500 that he or she is driving.

The image signal obtained by the image sensor 202 may be displayed on, for example, display devices 401, 402, 403 provided in a front portion of the vehicle 500 inside the vehicle cabin. Also, the image signal may be stored, as image data, for example, in a memory.

The display device 401 may be, for example, an electronic rear-view mirror.

The display devices 402 and 403 may be, for example, a navigation system and a front panel.

This allows the vehicle 500 to display, by using the onboard camera 100 including the imaging optical system 201, video presenting the circumstances in front of, behind, or beside, the vehicle 500 on the display device 401 or 402, for example. This allows the person onboard such as the driver to gaze at the circumstances in front of, behind, or beside, the vehicle 500.

As can be seen, the imaging optical system according to the present disclosure may be used effectively as a lens system for both a sensing camera and a view camera.

The fifth embodiment has been described as an exemplary embodiment of the present disclosure. Note that the fifth embodiment described above is only an example of the present disclosure and should not be construed as limiting. Rather, the fifth embodiment may be readily modified, replaced, combined with other embodiments, or partially omitted in various manners as appropriate.

For example, a lens having no substantive power may be added as appropriate to the single-focus system according to any one of the first to fourth embodiments.

The aspheric shape of the lenses included in the single-focus system according to the first to fourth embodiments does not have to be formed by polishing or molding. Alternatively, the lenses may also be, for example, so-called "replica lenses" (hybrid lenses), each being formed by coating the surface of a spherical lens with a film having an aspheric surface.

An example in which the imaging optical system according to any one of the first to fourth embodiments of the present disclosure is applied to an onboard camera implemented as either a sensing camera or a view camera has been described as the fifth embodiment of the present disclosure. However, this is only an example and should not be construed as limiting. Alternatively, the imaging optical system according to the present disclosure is naturally applicable to cameras built in smartphones and cellphones, surveillance cameras for surveillance systems, or Web cameras, for example.

EXAMPLES OF NUMERICAL VALUES

Next, exemplary sets of specific numerical values that were actually adopted in the imaging optical systems with the configurations according to the first, second, third, and fourth embodiments will be described. Note that in the tables showing these exemplary sets of numerical values, the length is expressed in millimeters (mm), the angle of view is expressed in degrees (°) (note that the "angle of view" in the tables refers to a horizontal half angle of view), r indicates the radius of curvature, d indicates the surface interval, nd indicates a refractive index with respect to a d-line, υd (also denoted as "vd") indicates an Abbe number with respect to a d-line, dn/dt indicates a refractive index temperature coefficient with respect to a d-line at a temperature falling within the range from 20° C. to 40° C. and is expressed by exponential notation (E notation) according to the JIS X 0210 standard, and a surface with an asterisk (*) is an aspheric surface. The aspheric shape is defined by the following equation.

$$Z = \frac{h^2/r}{1 + \sqrt{1 - (1+\kappa)(h/r)^2}} + \sum A_n h^n$$

where Z is the distance from a point on an aspheric surface, located at a height h measured from the optical axis, to a tangent plane defined with respect to the vertex of the aspheric surface, h is the height as measured from the optical axis, r is the radius of curvature of the vertex, κ is a conic constant, and $A_n$ is an $n^{th}$ order aspheric surface coefficient.

FIGS. 2, 4, 6, and 8 are longitudinal aberration diagrams of the imaging optical systems according to the first, second, third, and fourth examples of numerical values in the infinity in-focus state.

In each longitudinal aberration diagram, spherical aberration (SA (mm)), astigmatism (AST (mm)), and distortion (DIS (%)) are shown in this order from left to right.

In each spherical aberration diagram, the ordinate indicates the F number (designated by "F" on the drawings), the solid curve indicates a characteristic in response to a d-line, the shorter dashed curve indicates a characteristic in response to an F-line, and the longer dashed curve indicates a characteristic in response to a C-line.

In each astigmatism diagram, the ordinate indicates the image height, the solid curve indicates a characteristic with respect to a sagittal plane (designated by "s" on the drawings), and the dotted curve indicates a characteristic with respect to a meridional plane (designated by "m" on the drawings). Note that ω (also denoted as "w") indicates a horizontal half-angle of view.

Furthermore, in each distortion diagram, the ordinate indicates the image height and ω (also denoted as "w") indicates a horizontal half-angle of view.

In this case, the solid curve in the distortion diagram indicates an aberration in a situation where the ideal image height is given by Y=f·tan (ω) (where Y is an image height and f is the focal length of the entire system).

First Example of Numerical Values

Following is a first exemplary set of numerical values for the imaging optical system corresponding to the first embodiment shown in FIG. 1.

| (Surface data) | | | | | |
|---|---|---|---|---|---|
| Surface No. | r | d | nd | vd | dn/dt |
| Object surface | ∞ | | | | |
| 1* | 4.37540 | 1.32590 | 1.81055 | 41.1 | 5.7E−6 |
| 2* | 2.25470 | 2.67190 | | | |
| 3* | −5.51910 | 3.40340 | 1.81055 | 41.1 | 5.7E−6 |
| 4* | −5.92940 | 0.60980 | | | |
| 5 (aperture) | ∞ | 0.50050 | | | |
| 6 | 24.03650 | 3.83090 | 1.61997 | 63.9 | −2.9E−6 |
| 7 | −8.96020 | 1.40710 | | | |
| 8 | 26.15600 | 3.73590 | 1.61800 | 63.4 | −2.2E−6 |
| 9 | −6.17410 | 0.00500 | 1.56732 | 42.8 | |
| 10 | −6.17410 | 0.60000 | 1.92286 | 20.9 | 1.8E−6 |
| 11 | −24.80890 | 0.30000 | | | |
| 12 | 28.40770 | 2.80290 | 1.58913 | 61.3 | 3.7E−6 |
| 13 | −14.72000 | 0.00000 | | | |
| 14 | ∞ | BF | | | |
| Image plane | ∞ | | | | |

-continued

| (Aspheric surface data) |
| --- |
| 1$^{st}$ surface |
| K = −1.48365E−01, A4 = −5.11309E−03, A6 = −1.57488E−04, A8 = 1.70729E−05, A10 = −5.38841E−07 |
| 2$^{nd}$ surface |
| K = −2.49327E+00, A4 = 1.12935E−02, A6 = −2.12019E−03, A8 = 2.29147E−04, A10 = −8.07885E−06 |
| 3$^{rd}$ surface |
| K = −1.99929E−01, A4 = −1.78686E−03, A6 = −7.58569E−05, A8 = −5.95402E−07, A10 = −8.54962E−07 |
| 4$^{th}$ surface |
| K = 0.00000E+00, A4 = −1.08476E−04, A6 = −4.76612E−06, A8 = 2.43399E−07, A10 = −1.53701E−08 |

| (Various types of data) | |
| --- | --- |
| Focal length | 4.8928 |
| F number | 1.62724 |
| Angle of view | 64.0000 |
| Image height | 4.0337 |
| Total lens length | 25.9778 |
| BF | 4.78450 |
| Entrance pupil position | 4.5027 |
| Exit pupil position | −25.9692 |
| Anterior principal point | 8.4736 |
| Posterior principal point | 21.0848 |

| (Single-lens data) | | |
| --- | --- | --- |
| Lens | Start surface | Focal length |
| 1 | 1 | −7.9699 |
| 2 | 3 | 36.2638 |
| 3 | 6 | 11.0176 |
| 4 | 8 | 8.4558 |
| 5 | 10 | −9.0466 |
| 6 | 12 | 16.8643 |

Second Example of Numerical Values

Following is a second exemplary set of numerical values for the imaging optical system corresponding to the second embodiment shown in FIG. 3.

| (Surface data) | | | | | |
| --- | --- | --- | --- | --- | --- |
| Surface No. | r | d | nd | vd | dn/dt |
| Object surface | ∞ | | | | |
| 1* | 5.86720 | 1.47000 | 1.80610 | 40.7 | 7.9E−6 |
| 2* | 2.87630 | 2.94910 | | | |
| 3* | −5.39750 | 4.03810 | 1.80610 | 40.7 | 7.9E−6 |
| 4* | −6.99470 | −0.05280 | | | |
| 5 (aperture) | ∞ | 0.50000 | | | |
| 6 | 16.85710 | 4.48110 | 1.59282 | 68.6 | −5.7E−6 |
| 7 | −7.47480 | 1.20910 | | | |
| 8 | 17.64460 | 4.08780 | 1.59282 | 68.6 | −5.7E−6 |
| 9 | −5.73920 | 0.00500 | 1.56732 | 42.8 | |
| 10 | −5.73920 | 0.60000 | 1.92286 | 20.9 | 1.8E−6 |
| 11 | −19.40340 | 0.00500 | 1.56732 | 42.8 | |
| 12 | −19.40340 | 1.44640 | 1.72916 | 54.7 | 3.4E−6 |
| 13 | −12.53680 | 0.00000 | | | |
| 14 | ∞ | BF | | | |
| Image plane | ∞ | | | | |

-continued

| (Aspheric surface data) |
| --- |
| 1st surface |
| K = 2.42540E−01, A4 = −3.72448E−03, A6 = 3.64410E−07, A8 = 4.29785E−06, A10 = −1.43950E−07 |
| 2nd surface |
| K = −3.10503E+00, A4 = 7.07333E−03, A6 = −1.05225E−03, A8 = 1.03201E−04, A10 = −3.17322E−06 |
| 3rd surface |
| K = 1.05412E+00, A4 = −8.04282E−04, A6 = 6.37489E−05, A8 = 5.83983E−06, A10 = −5.99813E−08 |
| 4th surface |
| K = 0.00000E+00, A4 = 2.22241E−04, A6 = 2.22692E−05, A8 = 2.07640E−07, A10 = 8.22340E−08 |

| (Various types of data) | |
| --- | --- |
| Focal length | 4.8560 |
| F number | 1.62802 |
| Angle of view | 60.0000 |
| Image height | 4.0341 |
| Total lens length | 25.9943 |
| BF | 5.25550 |
| Entrance pupil position | 4.6104 |
| Exit pupil position | −19.5693 |
| Anterior principal point | 8.2614 |
| Posterior principal point | 21.1383 |

| (Single-lens data) | | |
| --- | --- | --- |
| Lens | Start surface | Focal length |
| 1 | 1 | −8.9665 |
| 2 | 3 | 228.3666 |
| 3 | 6 | 9.3782 |
| 4 | 8 | 7.8134 |
| 5 | 10 | −9.0211 |
| 6 | 12 | 44.6213 |

Third Example of Numerical Values

Following is a third exemplary set of numerical values for the imaging optical system corresponding to the third embodiment shown in FIG. 5.

| (Surface data) | | | | | |
| --- | --- | --- | --- | --- | --- |
| Surface No. | r | d | nd | vd | dn/dt |
| Object surface | ∞ | | | | |
| 1* | 4.87820 | 1.47000 | 1.80610 | 40.7 | 7.9E−6 |
| 2* | 2.56320 | 3.45190 | | | |
| 3* | −5.64550 | 4.12020 | 1.80610 | 40.7 | 7.9E−6 |
| 4* | −7.84880 | −0.15830 | | | |
| 5 (aperture) | ∞ | 0.52140 | | | |
| 6* | 10.61360 | 5.10000 | 1.59201 | 67.0 | −7.0E−7 |
| 7* | −8.45120 | 1.00540 | | | |
| 8 | 16.61910 | 3.63510 | 1.59282 | 68.6 | −5.7E−6 |
| 9 | −8.37910 | 0.00500 | 1.56732 | 42.8 | |
| 10 | −8.37910 | 0.60000 | 1.92286 | 20.9 | 1.8E−6 |
| 11 | 81.84740 | 0.00500 | 1.56732 | 42.8 | |
| 12 | 81.84740 | 2.07090 | 1.72916 | 54.7 | 3.4E−6 |
| 13 | −14.72950 | 0.00000 | | | |
| 14 | ∞ | BF | | | |
| Image plane | ∞ | | | | |

(Aspheric surface data)

1st surface

K = −2.20991E−01, A4 = −3.20613E−03, A6 = −4.86262E−05, A8 = 4.01742E−06, A10 = −1.02311E−07

2nd surface

K = −1.08793E+00, A4 = −1.75021E−03, A6 = −7.98643E−05, A8 = 1.86439E−05, A10 = −7.93577E−07

3rd surface

K = −1.49116E+00, A4 = −1.89421E−03, A6 = −3.72248E−05, A8 = −E35022E−06, A10 = −3.66396E−07

4th surface

K = 0.00000E+00, A4 = −1.22533E−05, A6 = 2.33327E−05, A8 = −5.23830E−07, A10 = 5.18589E−09

6th surface

K = 0.00000E+00, A4 = −5.51506E−05, A6 = 3.45380E−05, A8 = −1.17086E−06, A10 = 3.36727E−08

7th surface

K = 0.00000E+00, A4 = 3.98597E−04, A6 = 1.E67138E−05, A8 = −2.99422E−07, A10 = 4.08178E−08

(Various types of data)

| | |
|---|---|
| Focal length | 4.8547 |
| F number | 1.45814 |
| Angle of view | 60.0000 |
| Image height | 4.0347 |
| Total lens length | 26.6775 |
| BF | 4.85090 |
| Entrance pupil position | 5.1079 |
| Exit pupil position | −19.7548 |
| Anterior principal point | 8.7696 |
| Posterior principal point | 21.8230 |

(Single-lens data)

| Lens | Start surface | Focal length |
|---|---|---|
| 1 | 1 | −9.3504 |
| 2 | 3 | −150.8604 |
| 3 | 6 | 8.8251 |
| 4 | 8 | 9.9342 |
| 5 | 10 | −8.2101 |
| 6 | 12 | 17.2759 |

Fourth Example of Numerical Values

Following is a fourth exemplary set of numerical values for the imaging optical system corresponding to the fourth embodiment shown in FIG. 7.

(Surface data)

| Surface No. | r | d | nd | vd | dn/dt |
|---|---|---|---|---|---|
| Object surface | ∞ | | | | |
| 1* | 4.85780 | 1.69660 | 1.81055 | 41.1 | 5.7E−6 |
| 2* | 2.68620 | 3.10610 | | | |
| 3 | −27.93060 | 0.60920 | 1.70154 | 41.2 | 4.4E−6 |
| 4 | 8.50980 | 1.16450 | | | |
| 5 | 10.32430 | 4.12780 | 1.95375 | 32.3 | 4.4E−6 |
| 6 | −17.15780 | 2.35350 | | | |
| 7(aperture) | ∞ | 0.23710 | | | |
| 8 | 71.00550 | 4.45560 | 1.59282 | 68.6 | −5.7E−6 |
| 9 | −4.45850 | 0.00500 | 1.56732 | 42.8 | |
| 10 | −4.45850 | 0.65850 | 1.92286 | 20.9 | 1.8E−6 |
| 11 | −8.94710 | 0.53170 | | | |
| 12 | 9.83820 | 4.99910 | 1.80420 | 46.5 | 4.1E−6 |
| 13 | −17.36890 | 1.24380 | | | |

-continued

| | | | | | |
|---|---|---|---|---|---|
| 14 | −10.68750 | 2.20950 | 1.80518 | 25.5 | 9.0E−7 |
| 15 | −69.28910 | 0.00000 | | | |
| 16 | ∞ | BF | | | |
| Image plane | ∞ | | | | |

(Aspheric surface data)

$1^{st}$ surface

K = −4.60947E−01, A4 = −1.94353E−03, A6 = −1.08387E−04, A8 = 4.91796E−06,
A10 = −9.02563E−08, A12 = 4.53987E−10

$2^{nd}$ surface

K = −9.90859E−01, A4 = −1.56624E−03, A6 = −2.34822E−04, A8 = 1.77182E−05,
A10 = −3.45447E−07, A12 = 0.00000E+00

(Various types of data)

| | |
|---|---|
| Focal length | 5.3190 |
| F number | 1.44038 |
| Angle of view | 62.0000 |
| Image height | 4.0359 |
| Total lens length | 29.8657 |
| BF | 2.46770 |
| Entrance pupil position | 7.3155 |
| Exit pupil position | −12.6919 |
| Anterior principal point | 10.4054 |
| Posterior principal point | 24.5467 |

(Single-lens data)

| Lens | Start surface | Focal length |
|---|---|---|
| 1 | 1 | −11.4010 |
| 2 | 3 | −9.2339 |
| 3 | 5 | 7.2931 |
| 4 | 8 | 7.2354 |
| 5 | 10 | −10.3594 |
| 6 | 12 | 8.5065 |
| 7 | 14 | −15.9626 |

Values Corresponding to Inequalities

Values, corresponding to the Inequalities (1) to (7), of the respective examples of numerical values are shown in the following table:

| | $1^{st}$ example of numerical values | $2^{nd}$ example of numerical values | $3^{rd}$ example of numerical values | $4^{th}$ example of numerical values |
|---|---|---|---|---|
| Inequality (1) | 0.168 | 0.226 | 0.183 | 0.163 |
| Inequality (2) | 0.084 | 0.091 | 0.086 | 0.090 |
| Inequality (3) | 42.5 | 47.7 | 47.7 | 47.7 |
| Inequality (4) | −2.9E−6 | −5.7E−6 | −5.7E−6 | −5.7E−6 |
| Inequality (5) | 64.0 | 60.0 | 60.0 | 62.0 |
| Inequality (6) | 0.60 | 0.62 | 0.64 | 0.63 |
| Inequality (7) | −3.13 | −2.92 | −3.21 | −3.47 |

The first, second, third, and fourth embodiments have been described as exemplary embodiments of the present disclosure. The detailed description and accompanying drawings have been provided solely for the purpose of presenting such exemplary embodiments.

It should be noted, however, that the constituent elements mentioned in the detailed description and illustrated on the accompany drawings include not only essential constituent elements that have to be used to overcome the problem for the present disclosure but also other optional and inessential constituent elements that may be, but do not have to be, used to overcome the problem and that are mentioned or illustrated just for the purpose of providing some examples of the present disclosure. Therefore, those inessential constituent elements should not be construed as essential ones, simply because such inessential constituent elements are mentioned in the detailed description or illustrated on the drawings.

Note that the embodiments described above are only examples of the present disclosure and should not be construed as limiting. Rather, each of those embodiments may be readily modified, replaced, combined with other embodiments, or partially omitted in various manners without departing from the scope of the appended claims and their equivalents.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

INDUSTRIAL APPLICABILITY

The present disclosure is applicable to imaging optical systems for use in, for example, onboard cameras, surveillance cameras, and Web cameras. Among other things, the present disclosure is particularly effectively applicable as an imaging optical system to cameras such as onboard cameras that are required to have high image quality.

The invention claimed is:

1. An imaging optical system comprising:
a first lens having negative power and having a concave surface arranged to face an image;
a second lens having power;
a third lens having positive power;
a fourth lens having power; and
a fifth lens having power,
the first lens, the second lens, the third lens, the fourth lens, and the fifth lens being arranged in this order such as the first lens is located closer to an object than any other one of the second, third, fourth, and fifth lenses and that the fifth lens is located closer to the image than any other one of the first, second, third, and fourth lenses,
the imaging optical system satisfying conditions expressed by the following Inequalities (1) and (2):

$$R11/TTL < 0.25 \tag{1}$$

$$ThL1/Thsum < 0.15 \tag{2}$$

where R11 is a paraxial radius of curvature of an object-side surface of the first lens, TTL is a total optical length of the imaging optical system, ThL1 is a thickness of the first lens on an optical axis of the imaging optical system, and Thsum is a sum of respective thicknesses of all lenses, including the first, second, third, fourth, and fifth lenses, on the optical axis of the imaging optical system; and
the imaging optical system satisfying a condition expressed by the following Inequality (7):

$$-5.0 < (R12+R11)/(R12-R11) < -1.5 \tag{7}$$

where R12 is a paraxial radius of curvature of an image-side surface of the first lens.

2. The imaging optical system of claim 1, wherein
the fourth lens and the fifth lens are bonded together,
the fourth lens has positive power,
the fifth lens has negative power, and
the imaging optical system satisfies a condition expressed by the following Inequality (3):

$$30 < |vd\_L4 - vd\_L5| < 65 \tag{3}$$

where vd_L4 is an Abbe number with respect to a d-line of the fourth lens and vd_L5 is an Abbe number with respect to a d-line of the fifth lens.

3. The imaging optical system of claim 1, wherein
the imaging optical system satisfies a condition expressed by the following Inequality (4):

$$-7.0E-6 < \text{Min}(dn/dt) < 0.0E-6 \tag{4}$$

where Min (dn/dt) is the smaller one of respective refractive index temperature coefficients with respect to a d-line of the third lens and the fourth lens at a temperature falling within a range from 20° C. to 40° C., and E−6 is a minus sixth power of 10.

4. The imaging optical system of claim 1, wherein
the imaging optical system satisfies a condition expressed by the following Inequality (5):

$$45° < \omega \tag{5}$$

where ω is a half angle of view of the imaging optical system.

5. The imaging optical system of claim 1, wherein
the imaging optical system satisfies a condition expressed by the following Inequality (6):

$$0.4 < Thsum/TTL < 1.6 \tag{6}$$

6. A camera comprising:
the imaging optical system of claim 1 configured to form an optical image of the object; and
an image sensor configured to transform the optical image, formed by the imaging optical system, into an electrical image signal.

* * * * *